United States Patent
Bresolin

Patent Number: 5,518,611
Date of Patent: May 21, 1996

[54] INTERNAL CORNER FILTER, PARTICULARLY FOR SMALL TANKS AND AQUARIUMS

[76] Inventor: Valerio Bresolin, Via Cornon 9, 36020-Pove Del Grappa (Vicenza), Italy

[21] Appl. No.: 310,411

[22] Filed: Sep. 22, 1994

[30] Foreign Application Priority Data

Sep. 27, 1993 [IT] Italy ................. VI9300076 U

[51] Int. Cl.⁶ ............................................. B01D 79/88
[52] U.S. Cl. .................... 210/169; 210/416.2; 119/259
[58] Field of Search ........................ 210/169, 416.2, 210/455, 483; 119/259, 260

[56] References Cited

U.S. PATENT DOCUMENTS

| | | | |
|---|---|---|---|
| 2,515,538 | 7/1950 | Wall | 210/169 |
| 2,665,250 | 1/1954 | Willinger et al. | 210/169 |
| 3,540,591 | 11/1970 | Yamazaki | 210/169 |
| 3,994,807 | 11/1976 | Macklem | 210/169 |
| 4,783,258 | 11/1988 | Willinger et al. | 210/416.2 |
| 4,802,980 | 2/1989 | Gilkey et al. | 210/169 |
| 4,842,727 | 6/1989 | Willinger et al. | 210/416.2 |
| 5,011,600 | 4/1991 | Mowka, Jr. et al. | 210/416.2 |
| 5,336,401 | 8/1994 | Tu | 210/169 |

*Primary Examiner*—Christopher Upton
*Attorney, Agent, or Firm*—R. Neil Sudol; Henry D. Coleman

[57] ABSTRACT

An internal corner filter, particularly for tanks and aquariums, includes a container (2) that can be anchored to the upper rim of a tank (V) at an internal corner thereof. The container has a filtration part (9) and has an intake port (7) and a discharge port (8) which are connected to the tank (V). Circulation of the water to be filtered through the container (2) occurs by virtue of a pump which is coupled to as to avoid seepage and/or accidental leaks of water towards the outside of the aquarium.

10 Claims, 2 Drawing Sheets

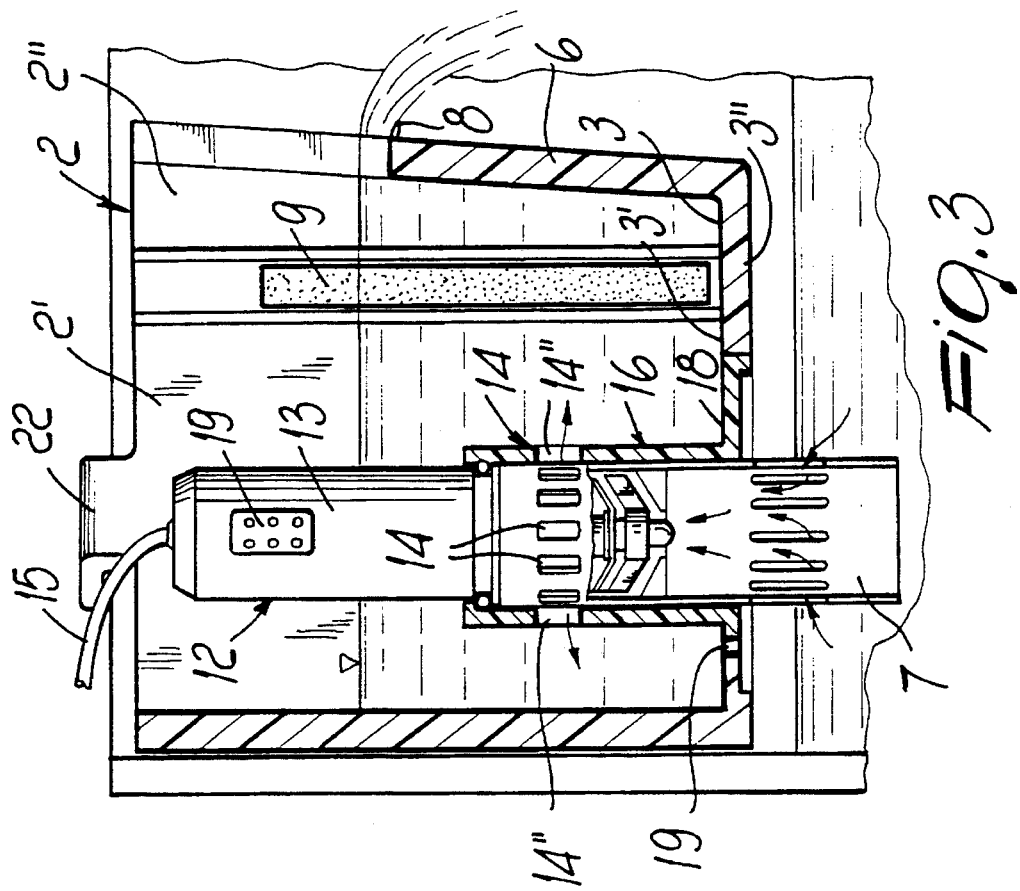
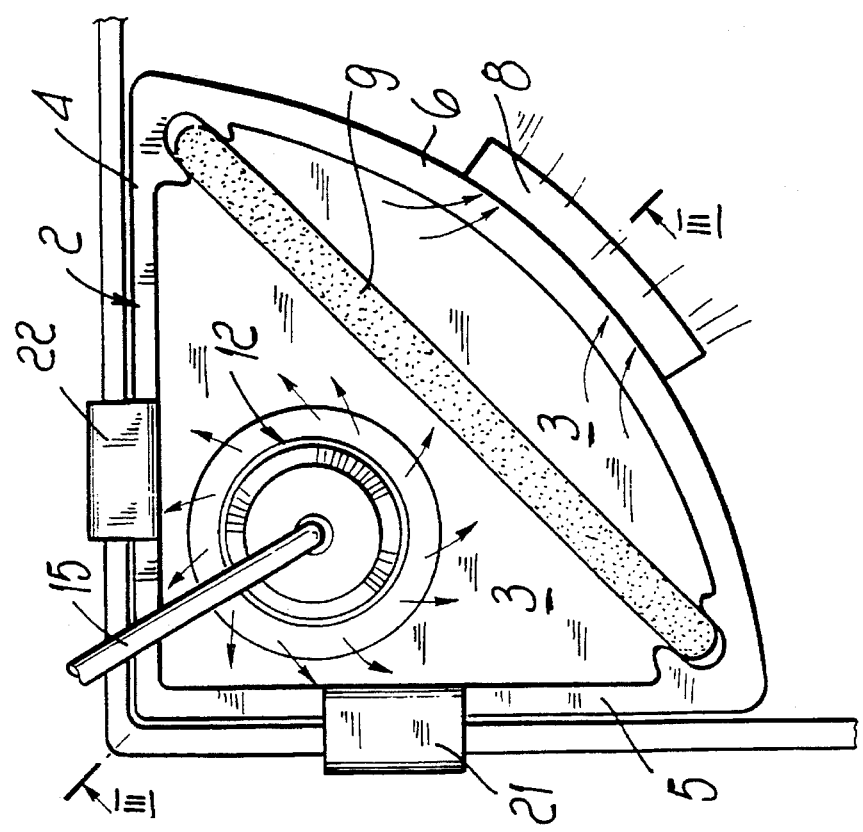

5,518,611

INTERNAL CORNER FILTER, PARTICULARLY FOR SMALL TANKS AND AQUARIUMS

BACKGROUND OF THE INVENTION

1. Field of the Invention

The present invention relates to an internal corner filter for small tanks and aquariums, of the type which can be placed in a corner of the tank.

2. Description of the Prior Art

Known corner filters are generally formed by a container that can be anchored to the bottom of the aquarium. A filtering material is arranged inside the container which has a closure lid, an inlet, and an outlet which are connected to an air pump for circulating the water to be filtered through the filter. The pump is located outside the aquarium and is connected to the filter by a small tube. The pump also has the purpose of aerating the pumped liquid and thus allows oxygenation of the life forms that live in the aquarium. The filtering material is generally constituted by natural or synthetic porous stones which retain impurities and allow the liquid to pass.

Although these known devices are in widespread use, they have some acknowledged structural and functional drawbacks, including first of all the presence of tubes, various connectors and a one-way valve to connect the container to the external pump and to prevent backflow of water if its delivery jams or clogs up. This leads to a certain complexity in construction and assembly which also increases the difficulty of operations for the maintenance of the device and worsen its overall aesthetic appearance, which does not harmonize with the ornamental function of the aquarium.

Another drawback is the high noise of the pump.

Another drawback of these filters is their excessive overall cost, which is also increased by the considerable cost of the external valves and connectors.

Another drawback is the limited life of the filtering material, which easily clogs and cannot be cleaned easily; this entails the replacement of the entire container, increasing the maintenance costs of the device.

The aim of the invention is to eliminate the drawbacks described above by providing an internal corner filter which is structurally simple and compact so as to be advantageous from an economical point of view.

An object is to provide an internal filter that has absolutely no external components, so as to simplify assembly and maintenance operations to the maximum possible extent.

Another object is to provide an internal filter that is quiet and is aesthetically very pleasant.

SUMMARY OF THE INVENTION

This aim, these objects and others which will become apparent hereinafter are achieved by a compact corner filter, particularly for small tanks and aquariums, comprising a container that can be anchored to the upper rim of a tank at an internal corner thereof, a filtration part, being arranged in said container, said container having an intake port and a discharge port which are connected to the inside of the tank and are connected to a pumping means for circulating the water to be filtered, said filtration part dividing the container into a first chamber and a second chamber which can be respectively connected to the outside by said intake port and said discharge port, said pumping means being constituted by a submersible micro-pump which is arranged inside said first chamber and has a suction inlet that is connected to said intake port.

By virtue of this arrangement, the filter is entirely included in the container, and has no connection to an external pumping means, thus being extremely simple and compact and easy to assemble and maintain.

BRIEF DESCRIPTION OF THE DRAWINGS

Further characteristics and advantages will become apparent from the detailed description of a preferred but not exclusive embodiment of the filtration device according to the invention, given by way of non-limitative example with the aid of the accompanying drawings, wherein:

FIG. 2 is a top view of the device of FIG. 1;

FIG. 3 is a sectional view of the device taken along the vertical plane III—III of FIG. 2.

DESCRIPTION OF A PREFERRED EMBODIMENT OF THE INVENTION

Figure 1:
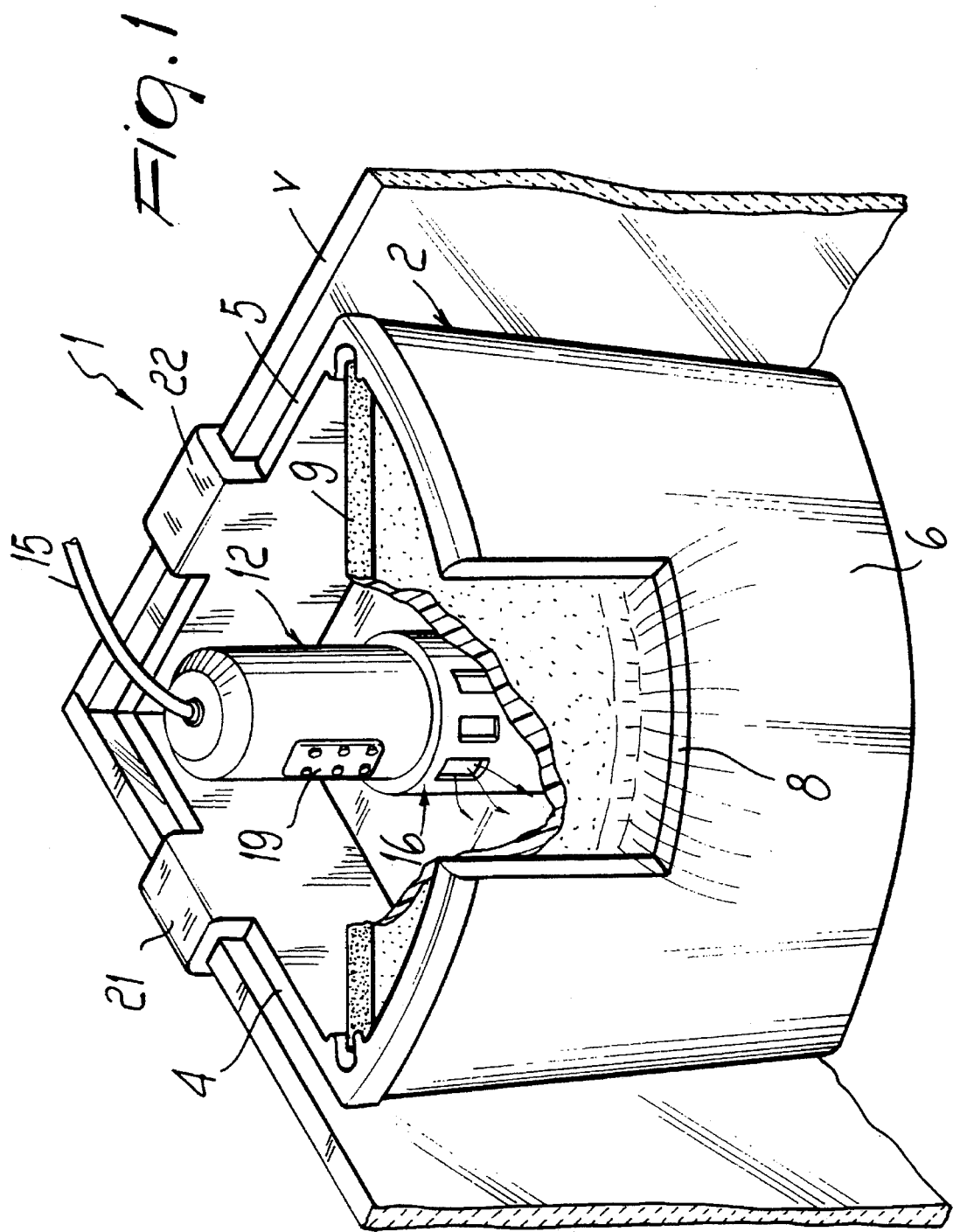
FIG. 1 is a general perspective view of the internal corner filter according to the invention.

With reference to the above figures, the internal corner filter, according to the invention, generally designated by the reference numeral 1, includes a container 2 that can be anchored to the internal upper rims in a corner of a tank or aquarium V.

The container 2 is generally prism-shaped, with a substantially triangular transverse cross-section formed by a base wall 3 and by three side walls 4, 5, and 6. The first two side walls 4 and 5 are substantially identical and flat and form a right angle between them. The third wall 6 is inclined with respect to the first two and is slightly curved outwards.

The container 2 is open at the top and has two ports 7 and 8: respectively a port 7, formed on the base wall 3, for the intake of the water to be filtered, and a port 8, formed on the curved side wall 6, for the discharge of the filtered water.

A filtration part 9 is arranged inside the container and is constituted by a substantially flat panel of fibrous material which is arranged vertically along the line that connects the acute angles of the triangular cross-section of the container, so as to divide the internal chamber of the container into a first partial chamber 2', connected to the tank V by the intake port 7, and a second partial chamber 2", connected to the tank by the discharge port 8.

The base wall 3 of the container 2 is correspondingly divided by the filtration part into a portion 3' and a portion 3" which belong to the respective chambers 2' and 2".

Conveniently, in order to stabilize the filtration part 9 in the desired position, two guides or longitudinal supports 10 and 11 are formed in the corners that lie between the side walls 4 and 5 and the curved side wall 6; said guides retain the vertical edges of the filtration panel.

The height of the filtration part 9 must be less than the maximum height of the container 2 and more than the overflow level of the discharge port 8, so as to avoid the overflow of the water contained by the edges of the container 2 if the filtration part 9 becomes clogged.

According to the invention, a submersible micro-pump 12 is detachably anchored in the intake chamber 2' of the container 2 and has a pump body 13 having a substantially cylindrical axial symmetry of the type disclosed in the European Patent Application No. 94109686.9.

A discharge outlet 14 is formed at the lower end of the pump body 13 and has a variable cross-section to adjust the flow-rate, whereas the cable 15 for the supply of electric power to the driving motor protrudes from the upper end.

Conveniently, the pump is connected to the intake port 7 by a choke pre-chamber which is formed by a cylindrical part 16 that is anchored to the bottom 3' of the chamber 2' by a circumferential edge 17 that abuts against a collar 18 formed on the base wall 3. A tooth 19 is formed on the collar 18 and engages a corresponding seat of the cylindrical part 16 to prevent its rotation about its own axis.

The adjustable discharge outlet 14 is constituted by a first series of radial openings 14' which are formed circumferentially on the side wall of the body 13, peripherally with respect to the impeller, and can be aligned with a second series of corresponding openings 14" that have the same spacing and are formed on the cylindrical part 16. The cylindrical body 13 is retained axially with respect to the cylindrical part 16, but can rotate with respect to said part 16 so as to vary the extent to which the radial openings 14' are closed, correspondingly varying the flow-rate.

Conveniently, the vertical position of the discharge port 8 is chosen so that it is lower than the upper portion of the pump body 13 which includes the electric parts, i.e. the connecting cable 15 and the switch 19, so that these parts always rise above the water. Accordingly, even if the pump is of the type that is encapsulated in epoxy resin, this arrangement is a safety enhancement to avoid leakage of current due to lack of insulation.

The container 2 can be anchored to the upper rim of the tank by a simple engagement means which consists of brackets 21, 22, shaped like an inverted U and formed monolithically along the upper edges of the side walls 4 and 5.

Accordingly, since the upper edges of the container are flush with the tank, no lid is necessary to protect the filter, because the lid of the aquarium itself is sufficient.

The operation of the filter is evident from what has been described above. Water is drawn in through the port 7 formed on the base wall 3' and is poured into the first chamber 2', upstream of the filtration part, and then passes through the filtration part 9 and exits through the discharge port 8, returning to the aquarium.

If the filtration part 9 is blocked, the water can overflow along its upper edge and returns to the tank, preventing the water from spilling outside the aquarium.

The interchangeable filtration part may be of the type with integrated porous elements and fibers, of a type that is easily commercially available, with different porosity values according to the requirements of the user. The intake piece 7 can be removed to place the tube beneath the gravel of the aquarium if required.

The container of the device is preferably made of transparent plastic by injection-molding or thermoforming.

The internal corner filter according to the invention achieves the intended aim and objects and particularly has an extremely compact and simplified structure with respect to similar devices of the prior art. Furthermore, the filter has no tubes, connectors and one-way valves and accordingly does not require particular connections, simplifying all the assembly and maintenance operations to the maximum possible extent. The external appearance of the filter is extremely neat and does not alter the ornamental purpose of the aquarium.

Although the invention has been described with reference to the embodiment illustrated in the drawings, it is understood that the filter is susceptible of numerous modifications and variations, all of which are within the scope of the inventive concept expressed by the accompanying claims.

I claim:

1. An internal corner filter, for use with a tank or aquarium, comprising:

a container including suspension means for removably mounting the container to an internal corner of a tank or aquarium, said container including a bottom wall, two adjacent, substantially orthogonal planar side walls, and an outwardly curved side wall connected at ends thereof to said planar side walls;

a filter element located within said container in a substantially vertical plane between said ends of said curved side wall, said filter element dividing said container into an intake chamber and a discharge chamber;

intake means, including a tubular connector with a substantially vertical axis, anchored to the bottom wall of said intake chamber for channeling contaminated water from the tank or aquarium into said intake chamber;

discharge means formed along an upper edge of said curved side wall for guiding filtered water from said discharge chamber into the tank or aquarium; and pumping means for drawing contaminated water from the tank or aquarium into said intake chamber, said pumping means including a submersible micro-pump having a cylindrical body sealingly mounted in said tubular connector for rotation about the substantially vertical axis of said tubular connector, said cylindrical body having an upper portion accommodating electric parts, a lower portion defining a suction inlet, and an intermediate portion defining outlet means communicating with said intake chamber, said outlet means having flow control means for providing an outlet passage of adjustable cross-section, wherein said discharge means is constituted by an indented portion of the upper edge of said outwardly curved side wall, said indented portion having a lower level than said upper portion of said cylindrical body, said flow control means including a first series of circumferentially spaced openings formed on said cylindrical body and a second series of circumferentially spaced openings formed on said tubular connector, said first and second series of openings being arranged for selective alignment upon a rotation of said cylindrical body around its vertical axis, thereby providing said outlet passage of adjustable cross-section.

2. The filter defined in claim 1, wherein said filter element is a substantially flat filter part, further comprising longitudinal guide means provided at said ends of said curved side wall for detachably retaining said flat filter part.

3. The filter defined in claim 2 wherein said flat filter part is a panel of porous material extending from said bottom wall to a level above the level of said indented portion and below the level of an upper edge of the container.

4. The filter defined in claim 1 wherein said tubular connector is provided with anchoring means for preventing a rotation of said tubular connector with respect to said base wall.

5. The filter defined in claim 1 wherein said suspension means includes a pair of brackets having a cross-section in the form of an inverted U, each bracket protruding from an upper edge of one of said planar side walls.

6. An internal filter, for use with a tank or aquarium, comprising:

a container including suspension means for removably mounting the container inside a tank or aquarium;

a filter element located within said container and dividing said container into an intake chamber and a discharge chamber having a bottom wall;

intake means, including a tubular connector with a substantially vertical axis, anchored to said bottom wall for channeling contaminated water from the tank or aquarium into said intake chamber;

discharge means on said container for guiding filtered water from said discharge chamber into the tank or aquarium; and pumping means for drawing contaminated water from the tank or aquarium into said intake chamber, said pumping means including a submersible micro-pump having a cylindrical body sealingly mounted in said tubular connector for rotation about the substantially vertical axis of said tubular connector, said cylindrical body having an upper portion accommodating electric parts, a lower portion defining a suction inlet, and an intermediate portion having flow control means for providing an outlet passage of adjustable cross-section, said flow control means including a first series of circumferentially spaced openings formed on said cylindrical body and a second series of circumferentially spaced openings formed on said tubular connector, said first and second series of openings being arranged for a selectively variable degree of alignment upon a rotation of said cylindrical body around its vertical axis, thereby providing said outlet passage of adjustable cross-section.

7. The filter defined in claim 6, wherein said filter element is a substantially flat filter part disposed vertically in said container.

8. The filter defined in claim 7 wherein said discharge means is constituted by an indented portion of an upper edge of said container, said indented portion having a lower level than said upper portion of said cylindrical body, said flat filter part being a panel of porous material extending from said bottom wall to a level above the level of said indented portion and below the level of an upper edge of the container.

9. The filter defined in claim 6 wherein said tubular connector is provided with anchoring means for preventing a rotation of said tubular connector with respect to said base wall.

10. The filter defined in claim 6 wherein said container includes a pair of planar side walls, said suspension means including a pair of brackets having a cross-section in the form of an inverted U, each bracket protruding from an upper edge of one of said planar side walls.

* * * * *